United States Patent [19]
Bergh et al.

[11] 3,739,217
[45] June 12, 1973

[54] SURFACE ROUGHENING OF ELECTROLUMINESCENT DIODES

[75] Inventors: Arpad A. Bergh, Murray Hill, Robert H. Saul, Scotch Plains, both of N.J.

[73] Assignee: Bell Telephone Laboratories, Incorporated, Murray Hill, N.J.

[22] Filed: June 23, 1969

[21] Appl. No.: 835,383

[52] U.S. Cl. .... 313/108 R, 313/108 D, 317/234 F, 317/235 N, 317/235 AG, 317/235 AJ
[51] Int. Cl. .......................... H01j 1/62, H01j 63/04
[58] Field of Search .................. 317/234, 235, 237; 313/108 D; 250/216, 228

[56] References Cited

UNITED STATES PATENTS

| | | | |
|---|---|---|---|
| 3,576,501 | 4/1971 | Deutsch | 331/94.5 |
| 3,501,679 | 3/1970 | Yonezu et al. | 313/108 D X |
| 3,537,028 | 10/1970 | Pankove | 317/235 X |
| 3,270,235 | 8/1966 | Loebner | 313/108 |
| 3,300,646 | 1/1967 | Casebeer | 317/235 X |
| 3,305,412 | 2/1967 | Pizzarello | 313/188 X |
| 3,427,516 | 2/1969 | Antell | 313/108 X |
| 3,487,223 | 12/1969 | St. John | 317/235 X |
| 3,517,244 | 6/1970 | Picus et al. | 317/234 X |

OTHER PUBLICATIONS

Internal Quantum Efficiency of GaAs Electroluminescent Diodes, By Dale E. Hill; Journal of Applied Physics, Vol. 36, No. 11, Nov. 1965, pages 3,405 to 3,409.

IBM Technical Bulletin, Vol. 9, No. 3 August 1966, Light emitting Diode Array by Yeh et al.

*Primary Examiner*—John W. Huckert
*Assistant Examiner*—Andrew J. James
*Attorney*—R. J. Guenther and Edwin B. Cave

[57] ABSTRACT

The emission of light from a high index of refraction electroluminescent body is limited by the phenomenon of total internal reflection. It has been found that, for devices of those materials which are transparent to their own radiation, such as GaP, the emission from a surface can be significantly increased by making that surface rough. Also, the spacial distribution of the emitted light can be influenced by the selection of rough and smooth surfaces. Chemical and alternative mechanical roughening processes are disclosed.

6 Claims, 4 Drawing Figures

INVENTORS
A. A. BERGH
R. H. SAUL
BY
ATTORNEY

SURFACE ROUGHENING OF ELECTROLUMINESCENT DIODES

BACKGROUND OF THE INVENTION

1. Field of the Invention

This disclosure bears on the surface treatment of electroluminescent light sources.

2. Description of the Prior Art

The emission of light generated within a luminescent solid is limited by the phenomenon of total internal reflection. Only those rays which approach the solid-ambient interface at an angle less than the critical angle ($\theta_c$) away from the perpendicular can pass through. All other rays are totally reflected back into the solid. For gallium phosphide (GaP) with index of refraction ($n$) equal to 3.2 at the visible part of the emitted spectrum, $\theta_c = 17.7°$, and less than 3 percent of the light approaching a surface will escape on the first try. If the material is moderately or highly absorptive of its own radiation (as is the case in gallium arsenide) much of the light reflected back into the solid will be rapidly absorbed. If the material is relatively transparent to its own radiation (as is the case in GaP) the reflected light can traverse the solid several times after successive reflections before major absorption. However, if the solid is a rectangular parallelepiped with smooth sides, the light suffering total internal reflection will never get out of the semiconductor since the angle of incidence is preserved at each succeeding reflection.

This problem could be partially solved by such a method as the grinding and polishing of the solid into a smooth hemisphere which is two or three times larger in diameter than the light producing region located at the center of the flat face. This geometry insures that all of the rays directed upward strike the surface of the hemisphere at angles less than $\theta_c$ from the perpendicular. This method has been successfully applied to gallium arsenide (*Appl. Phys. Lett.* 3 (1963) 173) but requires expensive machining and is wasteful of material. Another solution is the encapsulation of a light-producing wafer in a hemispherical dome of a high index of refraction polymer. This method is partially successful but is limited by the unavailability of polymers possessing index of refraction high enough to match that of the solid.

SUMMARY OF THE INVENTION

The internal reflection problem is attacked here by the inventive use of surface irregularities to control the angular distribution of the light radiation within the solid so that more may escape into the ambient and to control the angular distribution of the emerging light. Exemplary processes are disclosed. A chemical process involves the use of a preferential etch to produce a random rough surface. Mechanical processes involve the use of sandblasting liquid honing or grinding to the same end. These processes are intended to be exemplary of the many possibilities. However, the utility of periodic irregularities, such as machined grooves, in some situations, is included in this teaching.

The random roughening of the surface from which light is to be emitted to the ambient has two effects. First, the rough surface becomes a diffuse radiator obeying Lambert's Law, which states that the radiation density falls as the cosine of the angle away from the perpendicular to the surface. This provides a concentration of the emitted light in the perpendicular direction. Second, the light reflected back into the solid is reflected at random angles. It can be shown that to a first approximation no more light will escape from a rough plane surface at first incidence than would escape from a smooth plane surface. However, since the reflections are at random angles, a similar proportion of the light will escape on the second and succeeding times that the light is reflected back to the rough surface. This is in contrast to the case of a smooth plane which preserves reflection angles and tends to trap the reflected light. The utility of the various surface treatments in various particular situations will be more fully presented below.

DETAILED DESCRIPTION OF THE INVENTION

1. Dice

Figure 1:
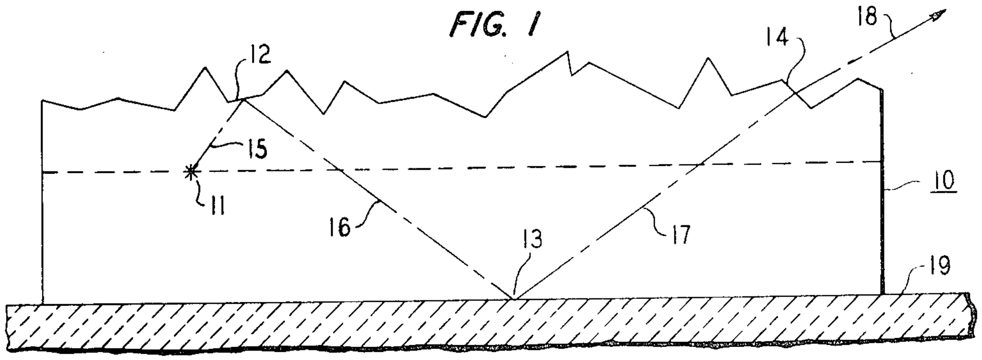
FIG. 1 is a side view in section of an electroluminescent diode with polished lower surface and sides and a roughened upper surface. The diode is bonded to a supporting structure.

The dice produced by scribing and cracking a thin polished electroluminescent plate approximates rectangular parallelepipeds. The emission from these dice will be strongly limited by total internal reflection if a roughening surface treatment is not employed. FIG. 1 shows such a die 10 bonded to a base plate 19. A light ray 15 produced by a portion of the p-n junction 11 is internally reflected at facet 12 of the upper surface, as ray 16. It is again internally reflected at the lower plane face 13, as ray 17, and escapes at facet 14, as ray 18, since it is incident on that facet 14 within $\theta_c$. If the upper surface were smooth, ray 15 would never have emerged from it. Here the upper surface is acting as a diffuse radiator.

Figure 2:
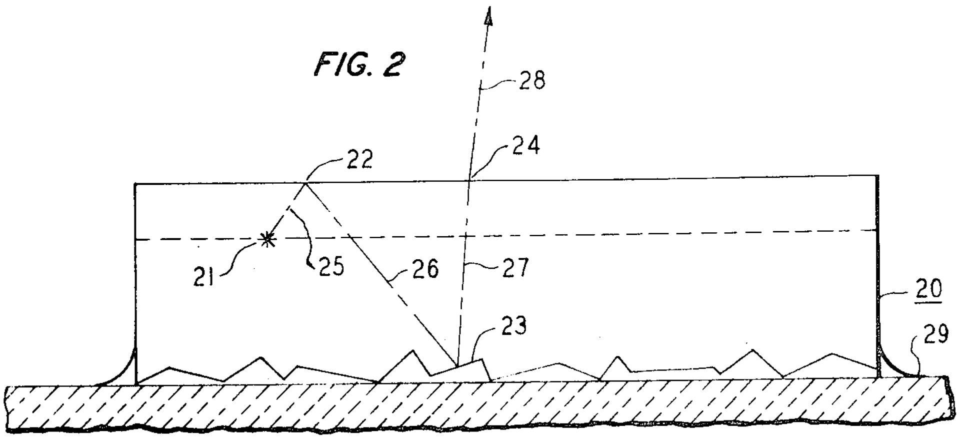
FIG. 2 is a side view in section of an electroluminescent diode with polished upper surface and sides and a roughened lower surface. The diode is bonded to a supporting structure.

FIG. 2 shows a similar die 20 which is bonded to a reflective plate 29 with the roughened side adjacent to the plate 29. Here the ray 25 produced at the junction 21 is internally reflected at the plane face 22. The reflected ray 26 strikes facet 23 and is again reflected. The reflected ray 27 has been reoriented by facet 23 and emerges from the solid at 24 as ray 28. Again, this ray 25 would have been trapped within the solid if one of the surfaces of the die had not been rough. Here the lower surface acts to reorient the internally reflected rays so that more of them can emerge from the upper surface 22, 24 the second time they are incident and on succeeding incidences. A combination of upper surface roughening, as depicted in FIG. 1, and lower surface roughening, as depicted in FIG. 2, is a logical extension of the above considerations.

Measurements have been performed on scribed and cracked dice using three mechanical roughening processes; sandblasting, liquid honing and grinding. In all three processes, abrasive particles are forced against the surface of the body to be roughened. The sandblasting process uses an air stream to carry the abrasive particles. Liquid honing makes use of a stream of liquid as the carrier. In grinding the particles are forced against the body by a solid backing plate. The measurements have shown increases of from 10 percent to 100 percent in the total light output from roughened devices.

Figure 3:
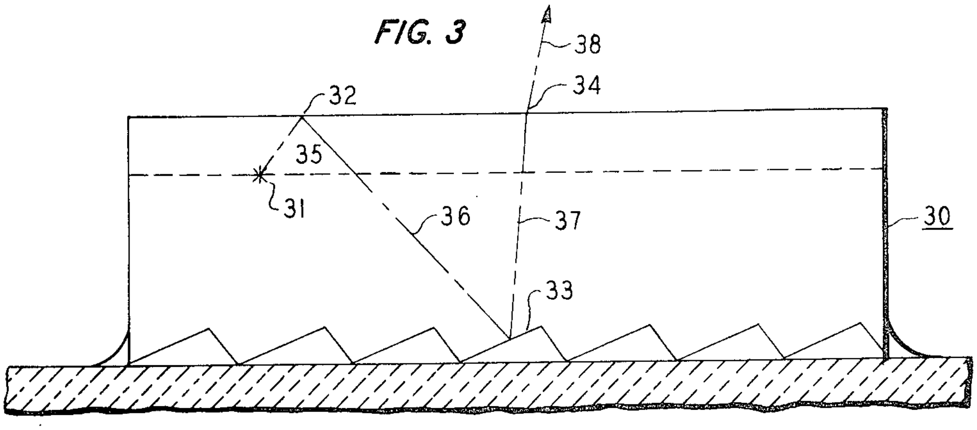
FIG. 3 is a side view in section of an electroluminescent diode with polished upper surface and sides and a lower surface containing periodic machined grooves. The diode is bonded to a supporting structure.

Considerations similar to those illustrated in FIGS. 1 and 2 obtain in the case of periodic irregularities on the upper or the lower die surface. FIG. 3 shows a die 30 with periodic irregularities on the lower (bonded) surface 33. Ray 35 is reoriented by the lower surface 33 and emerges at 34 as ray 38.

2. Mesa Structures

Figure 4:
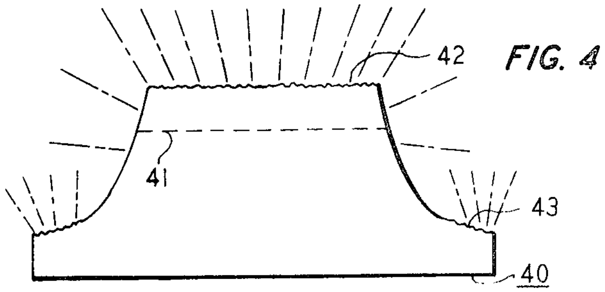
FIG. 4 is a side view in section of an electroluminescent mesa diode showing the dominant radiation pattern.

A somewhat different set of conditions is met in the case of a mesa structure such as is illustrated in FIG. 4. Here the structure itself is sufficiently irregular to allow the light to emerge after a number of reflections even if all sides are smooth. However, if one surface of the structure is roughened the emission of light from that surface is increased. Since a randomly rough surface acts as a diffuse radiator, the emitted light will be concentrated in a direction perpendicular to the roughened surface.

The mesa structure of FIG. 4 shows the effects of immersion of a GaP crystal in hydrofluoric acid (HF). In this structure the p-n junction 41 is parallel to a (111) crystal plane. Immersion in HF produces a roughening of surfaces 42, 43 which are generally parallel to the 111 plane. Measurements on such devices have shown typically a 40 percent increase in the light observed perpendicular to the junction 41 after a 15 minute immersion of the structure in concentrated HF at room temperature, the total light output being not significantly changed. The surface shows some visual diffuse character within seconds after immersion.

3. Ranges of Utility

The teachings of this disclosure can be usefully applied to electroluminescent materials which have a high index of refraction and are relatively transparent to the light which they produce. Materials such as GaP with very high index of refraction ($n = 3.2$ for GaP) are strongly limited by total internal reflection. For other materials of lower index, $\theta_c$ is larger so that more light can escape and less benefit is derived from the introduction of surface irregularities. When $n = 1.4$ the critical angle $\theta_c$ is 45° and all light can escape from a perfect, smooth rectangular parallelepiped body. No benefit is then derived from the introduction of surface irregularities.

Since, on the first incidence, the amount of transmission through an irregular surface is approximately equal to the transmission through a smooth surface, benefit can be derived from the introduction of surface irregularities only if internally reflected rays are not greatly attenuated as they pass through the body 10, 20, 30, and 40, are reflected again, and returned to the upper surface. The utility of this teaching is, thus, limited to electroluminescent bodies within which the intensity of a ray is attenuated by less than half as the ray traverses a path length equal to three times the thickness of the body (a distance roughly equal to two traversals at an angle greater than $\theta_c$). GaP falls well within this limit attenuating a ray by only 20 percent in a path length equal to three times a typical 0.013 inch body thickness.

Electroluminescent materials which are relatively transparent to the radiation they produce are typically those possessing an indirect semiconducting band gap such as GaP. Direct band gap materials such as gallium arsenide (GaAs) show orders of magnitude greater attenuation. Mixed crystals of GaAs show a gradual transition from an indirect toward a direct band gap. The actual cross over takes place at 36% GaP - 64% GaAs (*Semiconductors and Semimetals*, Willardson & Beer, pages 9 and 151 (Academic Press — 1966)). Thus, the teaching of this disclosure is applicable to a wide range of such GaP family mixed crystals as well as to other indirect band gap materials.

In order to have an appreciable influence on the angular distribution of light rays within and without the electroluminescent body, the surface irregularities must possess a maximum angular deviation greater than $\theta_c$ from the average surface plane and occupy a significant fraction of the surface of interest. An irregular surface whose macroscopic area (measured on a scale much larger than the interatomic spacing) is 50 percent greater than the area of the geometric surface plane falls well within these criteria.

4. Additional Consideration

The disclosure of chemical roughening in conjunction with mesa structures, of course, does not preclude the utility of this process in conjunction with diced wafers. Similarly the mechanical roughening of mesa structures is effective in producing the described results. The illustrative use of plane diode junction configurations in FIGS. 1, 2, 3, and 4 is also not meant to be limiting since the inclusion within the solid of other doping configurations in order to produce electroluminescent diodes with other desired characteristics or to produce multileaded electroluminescent structures (e.g., transistors) does not materially alter the optical behavior of the solid ambient interface. It is intended to include such devices within the teaching of this disclosure.

What is claimed is:

1. An electroluminescent body including at least one p-n junction, the body composed of a material in the gallium phosphide family including at least 36 weight percent gallium phosphide, remainder primarily gallium arsenide, characterized by the inclusion of at least one surface of the said body whose surface area is increased above the geometric plane area of the said surface by more than 50 percent, by means of the presence of surface irregularities whereby the light emission characteristics of the said body are improved.

2. A device of claim 1 wherein the said irregularities are produced by immersing the said body in a preferential etchant.

3. A device of claim 2 wherein the said preferential echant is composed essentially of hydroflouric acid.

4. A device of claim 1 wherein the said irregularities are produced by the grinding of the said surface.

5. A device of claim 1 wherein the said irregularities are produced by the sandblasting of the said surface.

6. A device of claim 1 wherein the said irregularities are produced by the liquid honing of the said surface.

* * * * *

Disclaimer 3,739,217.—*Arpad A. Bergh*, Murray Hill, and *Robert H. Saul*, Scotch Plains, N.J. SURFACE ROUGHENING OF ELECTROLUMINESCENT DIODES. Patent dated June 12, 1973. Disclaimer filed June 9, 1976, by the assignee, *Bell Telephone Laboratories, Incorporated.*

Hereby enters this disclaimer to claims 1 through 6 of said patent.

[*Official Gazette August 17, 1976.*]